United States Patent [19]

Timmons

[11] Patent Number: 4,636,242

[45] Date of Patent: Jan. 13, 1987

[54] SULFUR-BASED ENCAPSULANTS FOR FERTILIZERS

[75] Inventor: Richard J. Timmons, Marysville, Ohio

[73] Assignee: The O. M. Scott and Sons Company, Marysville, Ohio

[21] Appl. No.: 849,153

[22] Filed: Apr. 7, 1986

[51] Int. Cl.$^4$ .................................................. C05C 9/00
[52] U.S. Cl. ..................................... 71/28; 71/64.11; 106/287.32
[58] Field of Search .................. 71/1, 28, 64.02, 64.03, 71/64.07, 64.11, 64.12; 428/403, 704; 106/287.32, 287.24

[56] References Cited

U.S. PATENT DOCUMENTS

| | | | |
|---|---|---|---|
| 3,437,498 | 4/1969 | Martin | 106/287.32 X |
| 3,903,333 | 9/1975 | Shirley, Jr. et al. | 71/64.11 X |
| 3,991,225 | 11/1976 | Blouin | 71/64.02 X |

*Primary Examiner*—Ferris H. Lander
*Attorney, Agent, or Firm*—James B. Raden

[57] ABSTRACT

A slow release particulate fertilizer product in which the fertilizer particles are encapsulated with a sulfur coating. The sulfur coating is substantially crystalline and contains in admixture therewith from 0.05 to 2% (by weight of the coating) of a substituted symmetrical dialkyl polysulfide plasticizer as the sole organosulfur compound in the admixture. Fertilizer efficiency over standard sulfur coatings improves typically 40-50% with the plasticized sulfur coatings.

20 Claims, No Drawings

SULFUR-BASED ENCAPSULANTS FOR FERTILIZERS

BACKGROUND OF THE INVENTION

This invention relates to slow release particulate fertilizer products in which the fertilizer particles are encapsulated with a sulfur coating and to a process for preparing such products.

The benefits of slow release fertilizers are well established. Compared to soluble nutrients, these materials provide longer feeding and prevent initial unneeded lush growth and prevent the initial injury, especially to plant seedlings, often observed from immediately soluble fertilizers. The largest production of slow release fertilizers is of those chemicals which achieve their slow release properties through chemical bonding—principally the urea-formaldehyde fertilizers. This polymer series shows rapidly decreasing water solubility and corresponding rate of microbial decay with increasing molecular weight and thus achieves a graduated release of nutrients to the environment.

While urea-formaldehyde fertilizers constitute the bulk of the controlled release market, they are no longer the fastest growing segment. Coated or encapsulated fertilizers are rapidly gaining acceptance. While UF fertilizers typically produce a useful residual feeding of two months, encapsulated fertilizers can be tailored to deliver nutrients for up to a year. These coated products, because of their physical form, are less likely to cake than other slow release fertilizers. Similarly, the heavy encapsulated spheres can be broadcast rapidly and evenly over large areas.

While an array of polymers, waxes, and inorganic coatings have been described, the most widely produced encapsulated fertilizers utilize and sulfur shell. Sulfur is a very inexpensive coating and can be applied to fertilizers by drum coating which provides large processing cost savings in comparison to most other methods of encapsulation.

While sulfur has a large cost advantage, it has several drawbacks as a coating. Sulfur has a high surface tension and, therefore, gives poor wetting of defects on the substrate surface. Thus, coated product properties are highly dependent on substrate surface quality with resultant high variability of product quality. Sulfur is a brittle material and, in fact, releases nutrients through fractures when utilized as a coating. The more perfectly coated particles (smaller fractures) release more slowly.

The mechanism of release of nutrients through flaws gives rise to large inefficiencies. First, particles with large flaws release nutrients immediately and have no slow release benefit. At the other end of the scale, particles with minute or insignificant flaws do not release at all during the growing season. Sulfur has a very high interfacial tension with water ($S,H_2O=68$ dyne/cm) and is a poor coating for diffusion release.

Another practical disadvantage of the brittleness of sulfur coatings is the physical deterioration and loss of slow release properties in handling, e.g. in conveying, loading, unloading, and blending operations.

Two basic approaches have been taken to overcome the significant shortcomings of sulfur as a coating in slow release fertilizers. The most successful has been the application of a wax or a wax-like material as a topcoating on the sulfur. This is disclosed, for example, in U.S. Pat. No. 3,295,950 which issued on Jan. 3, 1967 to Blouin et al and is assigned to the Tennessee Valley Authority. The wax-sulfur interface provides a potent barrier to moisture and prevents much of the immediate release normally seen with sulfur-only coatings. In addition, the presence of wax allows for some reduction in the thickness of sulfur coat required, and this reduces the percentage of particles which do not release during the growing season. The wax coat may also provide some insulation to the sulfur shell from breakdown in handling.

However, the improvements brought about with wax come at a significant cost. In addition to the sulfur coating drum, the process must contain a second coating drum for wax application. The wax coating gives the product unacceptable physical properties, and so a conditioner must be added in a third drum. The wax requires an added microbiocide to prevent premature microbial degradation. The process equipment to provide the wax topcoat at least doubles the overall process equipment requirements. Because of this and the variability of available wax sources, TVA, who developed the wax topcoat process, investigated the replacement of this process by improving the efficiency of application of the sulfur coating alone. See R. D. Young, "TVA's Development of Sulfur Coated Urea", Bulletin Y-79, National Fertilizer Development Center, Tennessee Valley Authority, Muscle Shoals, Ala., August 1974.

The other approach, described in early sulfur coating reports, but not in use today, is the addition of plasticizers to the sulfur coating. This work appears to stem from the use of so-called plasticizers in sulfur-containing composites for road repair, road-making material, and coating concrete in building construction. The aforementioned Blouin et al U.S. Pat. No. 3,295,950 suggests the use in sulfur-coated fertilizers of 2 to 10 percent of such plasticizers as organic polysulfides, halides or phosphorus polysulfides. The polysulfides disclosed in Blouin et al are those based on styrene. Additives such as dicyclopentadiene, styrene, limonene and polythiols dissolve in sulfur to form polysulfides and have found use in sulfur composites. See U.S. Pat. No. 3,453,125 which issued on July 1, 1969 to Williams and B. R. Currell, A. J. Williams, A. J. Monney and B. J. Nash, "New Uses of Sulfur", J. R. West, Editor, p.l., American Chemical Society Advances in Chemistry Series, #140, 1975. Some of these additives, such as dicyclopentadiene, when added in 10% concentration or more, prevent any crystallization of sulfur for at least 18 months. This ability to slow the formation of crystalline sulfur became a part of the definition of sulfur plasticizer, and a test was developed to rate plasticizers on this basis. See the aforementioned B. R. Currell et al article as well as U.S. Pat. No. 4,233,082 which issued on Nov. 11, 1980 to M. Simie. A further publication, B. K. Bordoloi and E. M. Pearce, "New Uses of Sulfur-II", D. J. Bourne, Editor, p. 32, American Chemical Society Advances in Chemistry Series, #165, 1978, describes suppressing crystallization of sulfur by reaction with dicyclopentadiene and then adding a viscosity suppressor or plasticizer such as dodecyl polysulfide. However, it has been found that the addition of even small amounts (0.5%) of an additive to suppress crystallization does not produce a successful sulfur coating when used in combination with a polysulfide. The article by Bordoloi et al suggests the use of from 27 to 30% of dicyclopentadiene to suppress crystallization. Moreover, the plasticizers of the prior art were generally employed in higher concentrations, i.e. more than 2% and usually 10% or more. In addition to slowing the crystallization of sulfur, the prior art plasticizers increased its surface tension and viscosity, the increase being greater with time.

SUMMARY OF THE INVENTION

I have now discovered that, in contrast to the teachings of the prior art, any plasticizers or other additives to the sulfur coating must have a minimal effect on the crystalline phase of sulfur. The additive must allow rapid transformation of a strong crystalline phase on cooling. This objective is the inverse of the prior art definition of sulfur plasticizers. The present additives act as lubricants in the amorphous phase of sulfur to increase its elasticity (lower glass transition temperature). More specifically, the invention is directed to a slow release particulate fertilizer product in which the fertilizer particles are encapsulated with a sulfur coating, the sulfur coating being substantially crystalline and containing in admixture therewith from 0.05 to 2% by weight of the coating of at least one organosulfur compound of the formula:

$$R—S_n—R$$

wherein R is selected from the group consisting of a normal or branched alkyl group of from $C_8H_{17}$ to $C_{12}H_{25}$ and an alkyl carbonylic group of the formula:

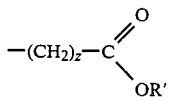

wherein Z is one or two and R' is selected from the group consisting of H and a normal or branched alkyl group of from $CH_3$ to $C_{12}H_{25}$ and n is 3 to 5, the aforesaid compound or compounds being the sole organosulfur compound or compounds in said admixture. The admixture of sulfur and the foregoing proportions of organosulfur compound will normally have a viscosity no greater than 15 centipoises at 150° C. and this is the upper limit of viscosity of the mixture.

The invention also includes the process of producing the slow release particulate fertilizer product by spraying under pressure a molten sulfur coating over the particles of fertilizer, the molten sulfur coating containing in admixture therewith the foregoing proportions of the foregoing organosulfur compounds, solidifying the molten sulfur coating, the solidified coating being substantially crystalline.

DETAILED DESCRIPTION

The organosulfur additives of the invention are nominally polysulfides, i.e. a mixture of predominantly tri-, tetra- and penta-sulfides. Accordingly, there will normally be a mixture of at least three of the polysulfides in the coating compositions. It is also possible to use mixtures of other polysulfides as long as all fall within the scope of the foregoing formula and are used in total amounts of 0.05 to 2%. However, no organosulfur compounds outside the scope of the formula should be present in the coating compositions. Many of such other organosulfur compounds react with the sulfur coating, creating an amorphous mass which raises the viscosity of the composition and causes agglomeration during the coating operation. Current sulfur coating is conducted in a rotating drum with a pressure (about 500 psig hydraulic) spray of molten sulfur. Any improved sulfur must maintain a low melt viscosity (<15 cp), near that of sulfur itself (8.3 cp) @ 150F° C. in order to flow over defects of the fertilizer particle surface before solidifying. At the same time, the droplets must solidify nearly as rapidly as those of pure sulfur to prevent particle agglomeration and deformation of the hot coatings. Sulfur containing the additives of the invention—and no other organosulfur additives—retains a low viscosity and solidifies rapidly from the melt. The polysulfide additives of the invention reduce the surface tension of sulfur, resulting in a lower contact angle of melt droplets on granular urea with better surface defect wetting.

The sulfur coatings of the invention require low melt viscosity, stability of viscosity with time and rapid rate of solidification of the fertilizer prills from the melt. These requirements determined the maximum concentration of plasticizer which could be used in sulfur. Typically, this maximum was found to be 1–2% of total coating weight. Amounts above 2% begin to destroy the effect of the coating and at 4% essentially revert the fertilizer to a quick release product.

Prills of the plasticized sulfur of the invention typically halve its breakdown in abrasion testing and nearly double its crush strength. Mechanical benefits of the new plasticized sulfur as a coating on fertilizer were determined by dropping batches of coated urea from a 10 ft. height into a steel beaker and observing the dissolution rate increase in the static leach. On this basis, the loss of slow release properties caused by mechanical impact on sulfur coated urea was reduced by ⅓ to ¾ when incorporating the new polysulfide plasticizers into the sulfur coat.

The correction of gross defects in the sulfur coating and the improved wetting of the fertilizer core defects provides a more uniform slow release product. Fertilizer efficiency as measured by turfgrass clipping weights improves typically 40–50% with the plasticized sulfur coatings of the invention. Similarly, fertilizers with the new plasticized sulfur coatings give additional weeks of satisfactory turf greening over that attainable with standard sulfur coatings.

The additives of the invention are substituted symmetrical dialkyl polysulfides having small symmetrical molecules containing bond linkages with low barriers to bond rotation (in this case, sulfur-sulfur bonds). Presumably, they are dispersed in the amorphous phase containing larger than 8-membered rings of sulfur and possible polymeric sulfur. Sulfur coatings containing these plasticizers crystallize rapidly-indicating little effect of the plasticizer on the crystalline phase of sulfur. The first requirement of a plasticizer for this system is solubility in sulfur. The chain of sulfur atoms in the additive imparts this necessary characteristic.

This new use of substituted symmetrical dialkyl polysulfides as plasticizers in sulfur allows the production of substantially improved sulfur coated fertilizers—both mechanically and agronomically—in one step with standard processing equipment. Product performance is achieved directly through improvements in the sulfur rather than "correcting" the product with additional expensive processing.

The sulfur coatings of the invention are preferably used on urea fertilizers and they will be so described in the examples. However, they are also useful on other particulate fertilizers such as ammonium nitrate and potassium sulfate.

The following examples illustrate the practice of the present invention. Unless otherwise indicated, all parts are by weight.

EXAMPLE 1

Polysulfides are a mixture of predominantly trisulfides, tetrasulfides, and pentasulfides. They are prepared by the amine-catalyzed reaction of the appropriate mercaptan with sulfur. In this example, (Butoxycarbonyl) ethyl Polysulfide (BCEPS) was prepared in accordance with the following reaction:

$2C_4H_9O-C(=O)-CH_2CH_2SH + 3S \rightarrow$
$H_2S + C_4H_9O-C(=O)-CH_2CH_2-S_n-CH_2CH_2-C(=O)-OC_4H_9$ wherein n is 3 to 5 with an average of about 4.

A 500-ml flask was equipped with a mechanical stirrer, heating mantle (on lab jack), thermometer and water cooled condenser. It was charged with 324.5 g. (2.0 mole) of n-butyl 3-mercaptopropionate, 96.2 g. (3.0 G-atom) of sulfur and 2.02 g. (0.02 mole) of triethylamine (1 mole % of amine to mercaptan). Gas evolution ($H_2S$ as detected by lead acetate paper) began with the addition of amine catalyst.

The reaction mixture was heated 8 hours @ 70° C. and allowed to cool over night. It was a bright red liquid. The condenser was removed and the reaction mixture was heated 1 hour @ 120° C. to expel triethylamine catalyst. The cool liquid weighed 385.6 g. It was an orange red liquid, assigned the acronym BCEPS.

The infra red reading of BCEPS showed an ester carbonyl @ 1730 cm$^{-1}$ and CH stretch for the butyl group at 2960, 2865, and 2915 cm$^{-1}$.

For $C_{14}H_{26}O_4S_4$:

|  | C | H | S | Mol. Wt. |
|---|---|---|---|---|
| Calc'd: | 43.49 | 6.78 | 33.17 | 386.63 |
| Found: | 44.28 | 6.76 | 32.84 | 379 |

The following additional polysulfides were prepared by following the procedure of Example 1:

| DDPS | Dodecyl Polysulfide | Pale Yellow-Green Oil |
|---|---|---|
| CEPS | Carboxyethyl Polysulfide | Buff-Colored Solid |
| HEPS | Hydroxyethyl Polysulfide | Orange Oil |
| MCEPS | (Methoxycarbonylethyl)-Polysulfide | Pale Yellow-Green Oil |
| DCEPS | (Dodecyloxycarbonylethyl)-Polysulfide | Buff-Colored Solid |

Of the foregoing compositions, all are within the scope of the invention except HEPS. In addition to the foregoing compounds, the following additional commercially available sulfide and non-sulfide compounds were also evaluated as plasticizing additives to sulfur:

| t-DDPS | tert-Dodecyl Polysulfide |
|---|---|
| DCPD | Dicyclopentadiene |
| Styrene | |
| MECHTL | 2-(Mercaptoethyl)cyclohexanethiol |
| LP-33 | Dimercaptan polymer of bis-(ethyleneoxy) methane containing disulfide linkages (Thiokol) |
| 510 Fluid | Dow Corning Silicone Fluid, 50 CST |
| 200 Fluid | Dow Corning Silicon Fluid, polydimethylsiloxane, 12,500 CST |

Of the above compounds, only t-DDPS is within the scope of the invention.

EXAMPLE 2

To 960 g. (550 ml) of molten filtered sulfur @ 150° C. in a 600 ml beaker was added 19.6 g. (2.0%) of (butoxycarbonyl) ethyl polysulfide (BCEPS). The BCEPS initially formed an upper layer which disappeared into a homogeneous solution within 2 hours. The viscosity remains constant @ 12.0 cps from 2 to 6 hours of heating (Brookfield Viscometer, Spindle #1, 30 rpm).

A prill solidification test was conducted of the sulfur-BCEPS composition by dropping approximately 30 drops at a time of the hot liquid into a 3 foot column of heavy mineral oil (Fisher Paraffin Oil, Saybolt Viscosity 35°) as the sulfur solution temperature was dropped from 135° to 130° and then increased to 135° C. The test was conducted at 2.5° C. intervals (6 tests) and resulted in 95% crystalline prills. However, nearly all crystalline prills except those generated @ 130° C. still contained a liquid portion. Overall, these results suggested that 2% BCEPS in sulfur crystallizes rapidly enough to generate prills for testing in the prilling tower and to coat urea.

Viscosity of the additive in molten sulfur solutions 5 hours after additive addition are shown in Table 1. As shown in later examples, solutions with viscosities above approximately 15 cps produced very poor coatings on urea. Also shown in Table I is the percent of solid prills obtained in the prill solidification test, as described in the above example with BCEPS. Typically, solutions which gave 20% or more solid prills in this test were suitable for producing test prills and for coating urea without excessive agglomeration.

TABLE I

| Additive Solution in Molten Sulfur | Melt Viscosity @ 150° C. (cps) | Solidification Test % Solid Prills |
|---|---|---|
| Sulfur Only | 8.3 | 100 |
| 0.5% LP-33 | 17 | 63 |
| 2.0% LP-33 | 24 | 22 |
| 0.5% DCPD | 16* | 45 |
| 2.0% DCPD | 34* | 5 |
| 0.5% Styrene | 12 | 54 |
| 0.5% MECHTL | 16 | 43 |
| 2.0% MECHTL | 29 | 23 |
| 510 Fluid, 100 ppm | 9 | 100 |
| 200 Fluid, 100 ppm | 8 | 100 |
| 0.5% HEPS | 11 | 99 |
| 2.0% HEPS | 15 | 17 |
| 0.2% CEPS | 10 | — |
| 0.5% CEPS | 11 | 86 |
| 2.0% CEPS | 16 | 100 |
| 0.5% DDPS | 10 | — |
| 2.0% DDPS | 13 | 100 |
| 0.5% t-DDPS | 11 | 62 |
| 0.5% MCEPS | 11 | 100 |
| 1.0% MCEPS | 12 | — |
| 0.5% BCEPS | 10 | — |
| 1.0% BCEPS | 12 | — |
| 2.0% BCEPS | 12 | 95 |
| 0.5% DCEPS | 10 | 36 |
| 1.0% DCEPS | 11 | — |

*Viscosity continued to increase throughout 5 hour heating period.

The results of Table 1 indicate maximum concentrations of the plasticizers in sulfur based on 20% or greater solid prills in the Solidification Test and viscosity near or below 15 cps as shown below.

| MAXIMUM CONCENTRATION OF ADDITIVES | | | |
|---|---|---|---|
| LP-33 | 0.5% | CEPS | 2% |
| DCPD | 0.5% | DDPS | >2% |

-continued

| MAXIMUM CONCENTRATION OF ADDITIVES | | | |
|---|---|---|---|
| Styrene | >0.5% | t-DDPS | >0.5% |
| 510 Fluid | >.01% | MCEPS | 1% |
| 200 Fluid | >.01% | BCEPS | >2% |
| MECHTL | 0.5% | DCEPS | 0.5-1% |
| HEPS | 1-2% | | |

EXAMPLE 3

To 970 g. of filtered sulfur held @ 150° C. in a 600 ml beaker was added 9.8 g. (1.0%) of (butoxycarbonyl) ethyl polysulfide (BCEPS). The product was held @ 150° C. for 5 hours, a small, ca. 5 g. sample was poured, and then the bulk was transferred to a 500 ml prilling flask equipped with heating mantle, side gooseneck with 1.5-mm. opening at the tip and nichrome heating wire wrapping, thermometer and inlet tube for nitrogen. The liquid temperature in the prilling flask was held @ 120°-125° C., and the nichrome wire on the side arm was supplied with 0.5 amp. power. The molten solution was forced dropwise by nitrogen pressure out of the gooseneck with an 18 inch fall through the air into a 4 foot long column of water 4 inches in diameter. After prilling was completed the water was removed from the column through a stopcock, and the prills were collected. They were allowed to dry on a sieve screen lined with paper towels in a hood for two days and then hand sieved. The −6+8 fraction weighed 167.0 g. and consisted of 31.4% of the total weight of prills. Sieving was done with U.S.A. #4, 6, 8, 12, 16 and 20 screens. The −6+8 fraction was held until one week of age before tests were conducted. The following tests were conduhcted:

1. Abrasion Test

The 167 g. of collected −6+8 prills was placed on top of a #6 screen. A #8 screen and pan were placed below. The material was sieved 5 minutes on a shaker. Two full 50-g. portions were obtained of −6+8 prills.

A 50-g. portion of prills was placed in the sieve pan with ten steel balls (1.5-cm. diameter, wt., 16 g.) and shaken without the hammer striking, for 10 minutes. The tested sample was placed on top of a nest of #6 and #8 screens and pan and sieved 5 minutes again with the hammer striking. The portion remaining in the −6+8 fraction was weighed. Assigning this value as REM (grams of remainder:)

$$\% \text{ BREAKDOWN} = \left(1 - \frac{REM}{50}\right) \times 100$$

For 1% BCEPS: % Breakdown=48.8%, 39.2%. Average=44.0%.

2. Crush Test

From the same prill sample of 1.0% BCEPS (−6+8) which was not used in the abrasion test, 20 prills were selected which were reasonably round and representative of the range of sizes found in the −6+8 portion. One at a time, the prills were tested on the pan of a top loading balance. A 1 cm. diameter glass stirring rod (flat end) was used to apply force to the prill in the 0-100 g. range of the balance. If the prill remainded intact, the range was changed to 100-200 g., and so on up to the maximum 1100-1200 g. range. Care is required to keep from applying a strong impact to the balance knives either when adding or removing force with the rod.

The range in use when the prill was crushed by the rod (eg. 400-500 g.) was recorded, and the nest prill tested. Prills which did not crush even in the 1100-1200 g. maximum range were assigned a crush strength of 1300 g. Precision between prills was poor in this test, but a second 20 prilled shows good agreement with the average value for the first 20 prills. For 1.0% BCEPS, the crush strength was 0.80±0.27 Kg.

EXAMPLE 4

A 1732-g. quantity of filtered sulfur in a 1200 ml. Stainless Steel beaker was heated with a heating mantle to 150° C., and 17.5 g. (1%) of BCEPS was added. The reaction mixture was held at 150° C. for 3 hours. The product was filtered through glass wool into a second 1200 ml. steel beaker in a heating mantle. The 150° C. filtered product was transferred to the tank of a hot melt spray applicator. The rate of delivery of hydraulic spray was adjusted to 2 g./second.

A 1 lb. quantity (454 g.) of −7+14 granular urea was placed in an 8-inch bed of a coating drum, heated to 60° C. while rotating, and sprayed with the 1% BCEPS in sulfur solution. The coated product was sieved −6+12 and submitted for static dissolution rate, % sulfur coat and agronomic screening. Coating weights employed were 24 and 30%.

Dissolution rates were determined for the coated urea products as follows:

A 25-g. sample of the coated urea was placed in 150 ml. of water and allowed to remain under static conditions at room temperature. Aliquots of the water solution containing dissolved released urea were treated with urease, and the liberated ammonia was titrated with standard acid. Results were expressed in percent of nitrogen released from the encapsulated urea. A number of additional samples were prepared in accordance with the procedures of Examples 3 and 4 using no additives to the sulfur coating, additives outside the scope of the invention and additives within the scope of the invention. Results of physical testing of the prilled coating material and dissolution rate of urea encapsulated with the coating are shown in Table II.

TABLE II

| | PRILLED COATING | | COATING ON UREA | |
|---|---|---|---|---|
| | ABRASION | CRUSH STRENGTH | | |
| COATING | TEST, % | Kg FORCE | COATING | DISSOLUTION RATE |
| SULFUR PLUS ADDITIVE | BROKEN PRILLS | PER PRILL | WEIGHT % | 7 DAYS |
| Sulfur Only | 76 | 0.4 | 24 | 48 |
| | | | 30 | 40 |
| Sulfur Preheated to 180° C. | 72 | 0.3 | 24 | 51 |
| | | | 30 | 36 |
| 0.5% LP-33 | 42 | 0.8 | 24 | 70 |
| | | | 30 | 59 |
| 2.0% LP-33 | 20 | 1.1 | 24 | 86 |

TABLE II-continued

| COATING SULFUR PLUS ADDITIVE | PRILLED COATING | | COATING ON UREA | |
|---|---|---|---|---|
| | ABRASION TEST, % BROKEN PRILLS | CRUSH STRENGTH Kg FORCE PER PRILL | COATING WEIGHT % | DISSOLUTION RATE 7 DAYS |
| 0.5% DCPD | 72 | 0.6 | 30 | 72 |
| | | | 24 | 68 |
| 0.5% Styrene | 73 | 0.6 | 30 | 56 |
| | | | 24 | 56 |
| 0.5% MECHTL | 79 | 0.5 | 30 | 39 |
| | | | 24 | 65 |
| 510 Fluid, 100 ppm | 67 | 0.6 | 30 | 55 |
| 200 Fluid, 100 ppm | 61 | 0.6 | — | |
| 0.5% HEPS | 82 | — | 24 | 57 |
| | | | 30 | 47 |
| 0.5% DDPS | 42 | 0.8 | 24 | 47 |
| | | | 30 | 37 |
| 2.0% DDPS | 39* | 0.4 | 24 | 64 |
| | | | 30 | 48 |
| 4.0% DDPS | — | — | 24 | 92 |
| | | | 30 | 85 |
| 0.5% t-DDPS | 42 | 1.15 | — | |
| 0.2% CEPS | 41 | 0.7 | 24 | 52 |
| | | | 30 | 32 |
| 0.5% CEPS | 54 | 0.8 | 24 | 77 |
| | | | 30 | 72 |
| 0.5% MCEPS | 61 | 1.0 | 24 | 54 |
| | | | 30 | 37 |
| 1.0% MCEPS | 37 | 0.7 | 24 | 70 |
| 0.5% BCEPS | 45 | 0.8 | 24 | 42 |
| | | | 30 | 32 |
| 1.0% BCEPS | 44 | 0.8 | 24 | 43 |
| | | | 30 | 34 |
| 2.0% BCEPS | 48* | 0.8 | 24 | 53 |
| | | | 30 | 46 |
| 0.5% BCEPS | 78 | 0.7 | 24 | 53 |
| | | | 30 | 40 |
| 1.0% DCEPS | 72* | 0.7 | 24 | 46 |
| | | | 30 | 38 |

*Sample contained irregular prills and flakes

Physical tests conducted on the coatings illustrate the suitability of additives for plasticizing sulfur when used in concentrations acceptable for fertilizer coating processing. As shown in Table II, the sulfur composite additives DCPD, Styrene, and MECHTL as well as HEPS provide no benefit to the mechanical properties of sulfur. On the other hand, the substituted symmetrical alkyl polysulfides DDPS, t-DDPS, CEPS, BCEPS, and MCEPS all provide substantial improvement to the physical properties of sulfur. DCEPS was shown to provide only slight improvement in abrasion results but significant improvement in crush strength as compared with sulfur only.

The static dissolution data was not found useful in differentiating between the better coated ureas. This distinction was obtained through agronomic and physical testing of these new coated products. The static leach is, however, useful in comparing results for different concentrations of the same coating and in spotting very poor coatings. With standard sulfur as a coating, 7 day dissolution rates are approximately 50% and 40% for 24 and 30% coatings, respectively. The very poor performance of coatings with LP-33 as additives is due to high viscosity (see Table I). The 4% DDPS coat is above the acceptable level of additive for rapid crystalization of the coating, and this is apparent in the dissolution rate.

EXAMPLE 5

Three sulfur samples containing polysulfide additives and one sample of standard sulfur were submitted to an independent laboratory for surface tension measurements with a contact angle goniometer. The surface energy and its polar and dispersive components for urea was obtained by contact angle measurements of purified diagnostic liquids on the solid urea granules. Liquid/vapor surface tension of molten sulfur solutions was determined by contact angles on standard Teflon at 125° C. and from the standard plot of the contact angles of purified diagnostic liquids on the same Teflon. Contact angles of sulfur on urea were meaured by placing micro droplets of molten sulfur directly onto urea granules heated to 84° C. The results are in Table III.

TABLE III

| Sulfur Plus Additive | Surface Tension @ 125° C. (dynes/cm) | Interfacial Tension on Urea @ 84° C. (dynes/cm) | Contact Angle Molten on Granular Urea |
|---|---|---|---|
| Sulfur Only | 58 | 39.1 | 70° |
| 2% DDPS | 44 | 24.8 | 39° |
| 1% CEPS | 52 | 24.9 | 49° |
| 1% BCEPS | 52 | 29.2 | 55° |

The substituted dialkyl polysulfides are not only plasticizers of sulfur. The contact angle data in the right column of Table III shows that they also give substantial improvement of the ability of sulfur to wet urea. These coatings containing polysulfide additives are capable of wetting surface defects of the fertilizer core much more effectively than sulfur alone. Thus, not only cohesive strength of the sulfur coating but also its adhesive strength to the fertilizer core is improved.

EXAMPLE 6

A batch coating drum with two molten sulfur nozzles was employed to coat 100 lbs. of urea at a time with the new plasticized sulfurs. The drum was equipped with a recycle function for the bed to enhance exposure of all fertilizer granules to the coating spray. The urea granules were preheated to 70° C., and the coating reservoir was maintained at 150° C. It was found necessary to cool quickly the encapsulated products when plasticizers were employed in the coat. The granules were screened to U.S. Sieve Series $-6+12$.

Products were aged one month and subjected to a drop test. A 250-ml beaker was made level full with sulfur coated urea (approximately 250 g). The granules were poured all at once down a 10-foot tube into a steel beaker. The increase in 1 hour and 1 week dissolution in the static leach from impact was recorded. The average increases are shown in Table IV.

TABLE IV

|  | Drop test Dissolution Rate Increase (1 Hr/1 Wk) |
|---|---|
| Sulfur Only, 20% Coat | (18/18) |
| Sulfur Only, 30% Coat | (16/26) |
| 2% DDPS, 20% Coat | (12/8) |
| 2% DDPS, 30% Coat | (9/12) |
| 1% BCEPS, 20% Coat | (5/4) |
| 1% BCEPS, 30% Coat | (9/18) |
| 0.5% MCEPS, 20% Coat | (7/10) |
| 0.5% MCEPS, 30% Coat | (9/19) |

Mechanical testing in the impact test thus shows the same kind of improvement for coated urea that was shown when the coatings were tested alone. Typically, with plasticized sulfur, the increase in dissolution rate after impact was only half that observed with a sulfur-only coating.

EXAMPLE 7

Bristol Kentucky bluegrass was grown in a sandy loam soil contained in a one quart container. The bluegrass turf was well established and exhibited good color and quality prior to treating. It was then treated with a variety of fertilizers—urea alone, urea contacted with sulfur only, urea coated with sulfur and an outer wax coating and urea coated with modified sulfur coatings both within and outside the scope of the invention. A control plot was left untreated. All fertilizers were weighed and hand-applied to each plot. The turf was watered immediately after application of the fertilizer and daily thereafter to provide one inch of water/week. Disease and insects were controlled by applying Karathane (common name is dinocap) and diazinon as needed. The turf was cut weekly for the first 7 weeks, then biweekly for fresh weight determination. Color (10>8 good, 7>5 fair, 4>1 poor), quality (good 1>3, fair 4>6, poor 7>10), height (cms), and injury (% brown blade) were also recorded at the same frequency. The tests were conducted over a period of 137 days. The fertilizers were applied at the rate of 4.5 lbs of nitrogen per thousand square feet (N/M). The color and quality numbers in the table are the number of times the color and quality respectively were ranked as good on the basis of 11 observations. Results are shown in Table V.

TABLE V

| Coating Modification | Coating (%)* | Dissolution Rate 7 Days | Color | Quality | Color & Quality | Cumulative Ht (cms) | Cumulative Wt (gms) | Fresh Weight 63-105th day | Maximum Injury (%) |
|---|---|---|---|---|---|---|---|---|---|
| Control | — | — | 0 | 0 | 0 | 1 | 0 | 0 | 0 |
| Urea No Coating | 0 | — | 4 | 4 | 8 | 28 | 3.1 | 0.25 | 25 |
| Sulfur Only | 30.3 | 32 | 5 | 9 | 14 | 30 | 4.2 | 0.85 | 1 |
| 2% CEPS | 30.3 | 52 | 10 | 10 | 20 | 40 | 6.6 | 1.28 | 1 |
| 0.5% MCEPS | 29.9 | 37 | 9 | 10 | 19 | 42 | 7.5 | 1.71 | 3 |
| 4.0% DDPS | 29.2 | 85 | 5 | 5 | 10 | 28 | 3.2 | .31 | 13 |
| Sulfur Only | 24.3 | 50 | 8 | 8 | 16 | 31 | 4.3 | .48 | 6 |
| 0.5% DDPS | 24.3 | 47 | 7 | 9 | 16 | 35 | 5.1 | .63 | 4 |
| 4.0% DDPS | 23.7 | 92 | 5 | 4 | 9 | 27 | 3.3 | .25 | 20 |

*Coating weights were determined by laboratory analysis. Similar coating weights were as close as experimentally possible to a target value.

As shown in Table V, turf treated with urea coated with 30% by weight of sulfur coating only exhibited good color and quality for only 14 observations or 64% of the time, with height, total fresh weight and residual fresh weight superior to turf treated with urea but dramatically less than turf fertilized with urea coated with sulfur modified with 2% CEPS or 0.5% MCEPS. It should be noted that 4% DDPS essentially destroyed the properties of the slow release coating—it no longer showed slow release properties. This illustrates the importance of staying below the 2% maximum additive limit.

EXAMPLE 8

Another series of tests were conducted on Bristol Kentucky bluegrass as in Example 7. Sulfur coated urea, the sulfur modified with known plasticizers (styrene, MECHTL and DCPD), all outside the scope of the invention, were compared with a control (no fertilizer), uncoated urea and urea coated with sulfur alone. The tests were conducted over a period of 130 days using 4.5 lbs of N/M. The color and quality tests were conducted as in Example 7, i.e., the number of times the color or quality was ranked as good, the number of observations being 9 for this example. Results are shown in Table VI.

TABLE VI

| Coating Modification | Coating (%) | Color | Quality | Color & Quality | Cumulative Ht (cms) | Wt (gms) | Fresh Weight 55-97th day | Maximum Injury (%) |
| --- | --- | --- | --- | --- | --- | --- | --- | --- |
| Control | — | 0 | 0 | 0 | 3 | 0.1 | 0 | 0 |
| Urea No Coating | 0 | 5 | 4 | 9 | 25 | 3.4 | 0.55 | 14 |
| Sulfur Only | 24.9 | 9 | 8 | 17 | 31 | 5.3 | 1.08 | 1 |
| 0.5% Styrene | 24.5 | 6 | 6 | 12 | 30 | 4.7 | 0.70 | 4 |
| 0.5% MECHTL | 24.5 | 7 | 7 | 14 | 29 | 4.7 | 0.77 | 3 |
| 0.5% DCPD | 24.3 | 6 | 6 | 12 | 28 | 4.7 | 0.84 | 7 |
| Sulfur Only | 30.3 | 8 | 9 | 17 | 26 | 4.7 | 0.78 | 0 |
| 2% BCEPS | 29.5 | 9 | 9 | 18 | 29 | 5.6 | 1.48 | 0 |

As shown in Table VI, sulfur modified with known plasticizers (styrene, MECHTL, DCDP) did not improve the residual (based on leaf fresh weight 55-97th day) as compared to turf fertilized with urea coated with sulfur only. However, when the sulfur was modified with 2% BCEPS (having substantially the same coating weight), the residual was dramatically improved (0.78 versus 1.48 gms fresh weight).

EXAMPLE 9

A further series of tests were conducted on Bristol Kentucky bluegrass as in Example 7. Urea coated with sulfur only was compared with urea coated with sulfur modified in accordance with the present invention. The tests were conducted over a period of 78 days using 4.5 lbs of N/M. The color and quality tests were conducted as in Example 7, the number of observations being 11 for this example. Results are shown in Table VII.

turf fertilized with urea only. However, if the substantially same weight sulfur was modified with BCEPS (0.5-1%), MCEPS (1%) or DCEPS (1%), the residual based on leaf fresh weight (64-78th day) was improved 34-88% as compared to turf fertilized with urea coated with sulfur only. At a lower coating weight (about 24%), these same additives again improved residual by 45-116% over turf fertilized with urea coated with sulfur only.

EXAMPLE 10

A further series of tests were conducted on Bristol Kentucky bluegrass as in Example 7. Urea coated with sulfur only was compared with urea coated with sulfur modified with polysulfides both within and outside the scope of the invention. The tests were conducted over a period of 130 days using 4.5 lbs of N/M. The color and quality tests were again as in Example 7, the number of observations being 9 for this example. Rsults are shown in Table VIII.

TABLE VII

| Coating Modification | Coating (%) | Color | Quality | Color & Quality | Cumulative Ht (cms) | Wt (gms) | Fresh Weight 64-78th day | Maximum Injury (%) |
| --- | --- | --- | --- | --- | --- | --- | --- | --- |
| Control | — | 0 | 1 | 1 | 13 | 0.9 | 0.17 | 0 |
| Urea No Coating | 0 | 4 | 3 | 7 | 30 | 5.1 | 0.55 | 18 |
| Sulfur Only | 29.5 | 9 | 11 | 20 | 34 | 6.8 | 0.93 | 0 |
| 1% BCEPS | 29.8 | 9 | 11 | 20 | 38 | 9.9 | 1.32 | 0 |
| 0.5% BCEPS | 29.8 | 11 | 11 | 22 | 37 | 9.5 | 1.75 | 2 |
| 1.0% MCEPS | 30.6 | 11 | 11 | 22 | 41 | 8.8 | 1.25 | 0 |
| 1.0% DCEPS | 29.5 | 9 | 11 | 20 | 33 | 6.8 | 1.67 | 1 |
| Sulfur Only | 24.1 | 7 | 5 | 12 | 32 | 6.0 | 0.70 | 2 |
| 1.0% BCEPS | 24.0 | 11 | 11 | 22 | 39 | 8.9 | 1.58 | 2 |
| 0.5% BCEPS | 24.0 | 11 | 11 | 22 | 38 | 8.2 | 1.40 | 1 |
| 1.0% MCEPS | 24.1 | 11 | 11 | 22 | 38 | 7.7 | 1.06 | 2 |
| 1.0% DCEPS | 24.3 | 11 | 9 | 20 | 34 | 6.9 | 1.36 | 1 |

As shown in Table VII, urea coated with 29.5% sulfur only exhibited improved residual as compared to

TABLE VIII

| Coating Modification | Coating (%) | Color | Quality | Color & Quality | Cumulative Ht (cms) | Wt (gms) | Fresh Weight 55-97th day | Maximum Injury (%) |
| --- | --- | --- | --- | --- | --- | --- | --- | --- |
| Control | — | 0 | 0 | 0 | 3 | 0.1 | 0 | 0 |
| Urea No Coating | 0 | 5 | 4 | 9 | 25 | 3.4 | 0.55 | 14 |
| Sulfur Only | 30.3 | 8 | 9 | 17 | 26 | 4.7 | 0.78 | 0 |
| 0.5% HEPS | 30.2 | 5 | 7 | 12 | 27 | 4.2 | 0.74 | 1 |
| 2% BCEPS | 29.5 | 9 | 9 | 18 | 29 | 5.6 | 1.48 | 0 |
| Sulfur Only | 24.6 | 9 | 8 | 17 | 31 | 5.3 | 1.03 | 1 |
| 0.5% HEPS | 24.1 | 6 | 6 | 12 | 25 | 3.6 | 0.36 | 0 |
| 0.5% Styrene | 24.5 | 6 | 6 | 12 | 30 | 4.7 | 0.70 | 4 |
| 0.5% MECHTL | 24.5 | 7 | 7 | 14 | 29 | 4.7 | 0.77 | 3 |

| Coating Modification | Coating (%) | Color | Color & Quality | Quality | Cumulative Ht (cms) | Wt (gms) | Fresh Weight 55-97th day | Maximum Injury (%) |
|---|---|---|---|---|---|---|---|---|
| 0.5% DCPD | 24.3 | 6 | 6 | 12 | 28 | 4.7 | 0.84 | 7 |

As shown in Table VIII, sulfur at the approximately 30% and 24% coating weight levels modified with known plasticizers (HEPS, styrene, MECHTL, DCPD) did not improve the residual, based on leaf fresh weight 55-97th day, as compared to turf fertilized with urea coated with sulfur only. However, when the sulfur was modified with 2% BCEPS, the residual was dramatically improved over the sulfur only standard at 30% coating weight (1.48 versus 0.78 gms fresh weight).

I claim:

1. In a slow release particulate fertilizer product wherein the fertilizer particles are encapsulated with a sulfur coating:
the improvement in which the sulfur coating is substantially crystalline and contains in admixture therewith from 0.05 to 2% (by weight of the coating) of at least one organosulfur compound of the formula:

$$R-S_n-R$$

wherein R is selected from the group consisting of a normal or branched alkyl group of from $C_8H_{17}$ to $C_{12}H_{25}$ and an alkyl carboxylic group of the formula:

$$-(CH_2)_z-C\begin{matrix}\nearrow O \\ \searrow OR'\end{matrix}$$

wherein z is 1 or 2 and R' is selected from the group consisting of H and a normal or branched alkyl group of from $CH_3$ to $C_{12}H_{25}$ and n is 3 to 5, said aforesaid compound or compounds being the sole organosulfur compound or compounds in said admixture.

2. The fertilizer product of claim 1 in which said admixture has a viscosity no greater than 15 centipoises at 150° C.

3. The fertilizer product of claim 1 in which said organosulfur compound is (butoxycarbonyl)ethyl polysulfide.

4. The fertilizer product of claim 1 in which said organosulfur compound is dodecyl polysulfide.

5. The fertilizer product of claim 1 in which said organosulfur compound is carboxyethyl polysulfide.

6. The fertilizer product of claim 1 in which said organosulfur compound is (methoxycarbonylethyl)-polysulfide.

7. The fertilizer product of claim 1 in which said organosulfur compound is (dodecyloxycarbonylethyl)-polysulfide.

8. The fertilizer product of claim 1 in which said organosufur compound is tert-dodecyl polysulfide.

9. The fertilizer product of claim 1 in which said fertilizer particles are urea particles.

10. A process for producing a slow release particulate fertilizer product wherein the fertilizer particles are encapsulated with a sulfur coating comprising:
spraying under pressure a molten sulfur coating over the fertilizer particles, said molten sulfur coating containing in admixture therewith from 0.05 to 2% (by weight of the coating) of at least one organosulfur compound of the formula:

$$R-S_n-R$$

wherein R is selected from the group consisting of a normal or branched alkyl group of from $C_8H_{17}$ to $C_{12}H_{25}$ and an alkyl carboxylic group of the formula:

$$-(CH_2)_z-C\begin{matrix}\nearrow O \\ \searrow OR'\end{matrix}$$

wherein z is 1 or 2 and R' is selected from the group consisting of H and a normal or branched alkyl group of from $CH_3$ to $C_{12}H_{25}$ and n is 3 to 5, said aforesaid organosulfur compound or compounds being the sole organosulfur compound or compounds in said admixture,
solidifying said molten sulfur coating, said solidified coating being substantially crystalline.

11. The process of claim 10 in which said admixture has a viscosity no greater than 15 centipoises at 150° C.

12. The process of claim 10 in which said molten sulfur is sprayed at a temperature of from 140° to 160° C.

13. A substantially crystalline sulfur coating composition comprising sulfur in admixture with from 0.05 to 2% (by weight of the coating) of at least one organosulfur compound of the formula:

$$R-S_n-R$$

wherein R is selected from the group consisting of a normal or branched alkyl group of from $C_8H_{17}$ to $C_{12}H_{25}$ and an alkyl carboxylic group of the formula:

$$-(CH_2)_z-C\begin{matrix}\nearrow O \\ \searrow OR'\end{matrix}$$

wherein z is 1 or 2 and R' is selected from the group consisting of H and a normal or branched alkyl group of from $CH_3$ to $C_{12}H_{25}$ and n is 3 to 5, said aforesaid compound or compounds being the sole organosulfur compound or compounds in said admixture.

14. The coating composition of claim 13 in which said admixture has a viscosity no greater than 15 centipoise at 150° C.

15. The coating composition of claim 13 in which said organosulfur compound is (butoxycarbonyl)ethyl polysulfide.

16. The coating composition of claim 13 in which said organosulfur compound is dodecyl polysulfide.

17. The coating composition of claim 13 in which said organosulfur compound is carboxyethyl polysulfide.

18. The coating composition of claim 13 in which said organosulfur compound is (methoxycarbonylethyl)-polysulfide.

19. The coating composition of claim 13 in which said orgnosulfur compound is (dodecyloxycarbonylethyl)-polysulfide.

20. The coating composition of claim 13 in which said organosulfur compound is tert-dodecyl polysulfide.

* * * * *